July 7, 1964  A. A. McGEE, JR  3,140,422
INDICATOR LAMP CIRCUIT
Filed June 6, 1960
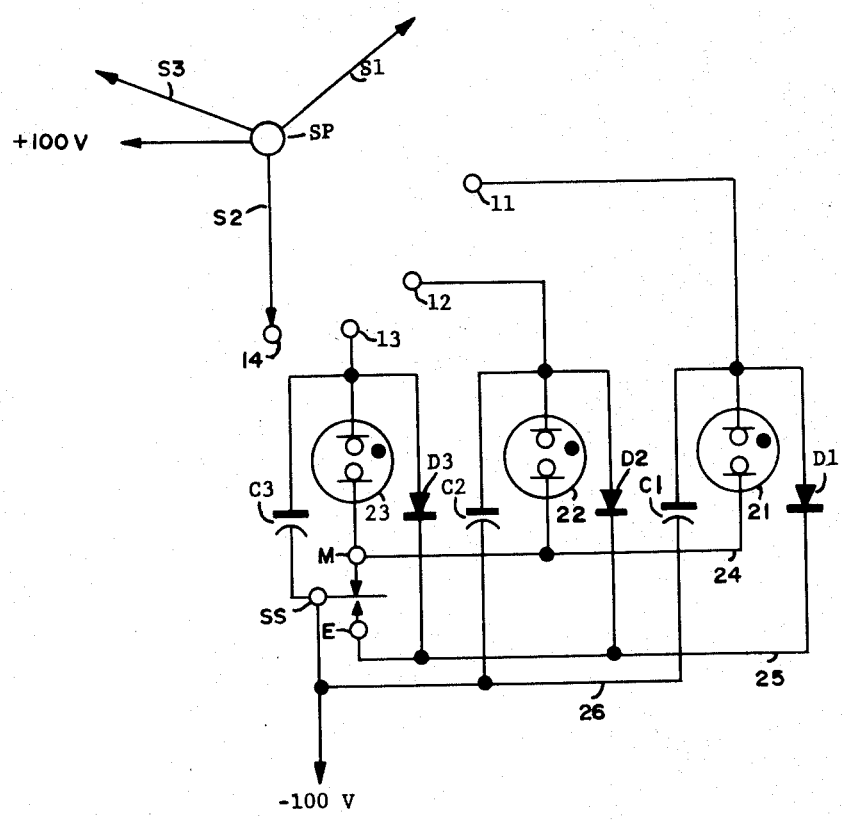
INVENTOR.
ARCHIE A. MCGEE, JR.
BY John B. Sponsler

United States Patent Office 3,140,422
Patented July 7, 1964

3,140,422
INDICATOR LAMP CIRCUIT
Archie A. McGee, Jr., Lynchburg, Va., assignor to General Electric Company, a corporation of New York
Filed June 6, 1960, Ser. No. 34,202
2 Claims. (Cl. 315—132)

This invention relates to indicating devices for use in electrical circuits, and more particularly to indicating lamps utilized for showing the condition of electrical circuits in alarm control systems and the like.

Frequently in the use of complex electrical circuits it is found desirable to know the condition of various circuits by the use of indicating lamps whereby a succession of testing or checking conditions are determined following certain routine operations before or during the operation of the prime circuits of the apparatus. As each test or check is made an indicator lamp is lighted and maintained for a predetermined period until "run down" of all the tests is completed. Normally these lamps or indicators are energized by relay contacts including both "pick-up" and "holding" contacts. Where a large number of tests entailing the requirement of many indicating lamps and a corresponding number of relays is made the cost of the relays becomes prohibitive. The present invention is directed to eliminating the requirement for relays in devices of this kind thereby reducing the cost of such equipment to a measurable extent.

Accordingly it is an object to this invention to provide a simple and economical indicator lamp system incorporating a plurality of indicator lamps that can be successively energized without the use of costly relays and the like.

Another object of this invention is to provide a lamp indicator system with a minimum of moving parts or contacts to effect favorable maintenance conditions in such equipment.

Still another object of this invention is to provide an indicator lamp circuit including a plurality of indicators which can be quickly and simply returned to de-energized conditions without the use of cumbersome auxiliary circuits.

Other objects and advantages of this invention will be apparent from the following description taken in conjunction with the accompanying drawing which is a schematic diagram of one mode of the novel indicating lamp circuit embodying this invention.

In the drawing a multi-contact switch SP having a plurality of contacts 11, 12, 13, each respectively connected to the lamps 21, 22, 23, is arranged to rotate its arms S1, S2, S3 to make contact with the aforementioned contacts in succession in accordance with some predetermined pattern of tests so that the lamps are energized successively from a 100 volt direct current source. Each of the lamps may be a well known two-element gas discharge device such as a neon lamp. The common connection to the lamps is provided through a normally closed contact M of a double throw single pole switch SS to the direct current source as shown. Associated with each lamp is a capacitor such as the capacitors C1, C2, C3, the value of the capacitor being chosen in accordance with other circuit characteristics so that it is enabled to maintain the lamp energized for a predetermined time after the direct current source is removed from directly energizing the lamp. A diode is provided for each capacitor, such as the diodes D1, D2, D3, in order to discharge the capacitor as explained hereinafter.

Let it be assumed that the circuit test routine calls for the three lamps 21, 22, and 23 to be energized. As the switch SP is rotated to have its arm S1 make contact with contact 11 the lamp 21 is energized via +100 volt supply, switch SP, contact 11, line 24, contact M, switch SS and —100 volt supply. The capacitor C1 is charged at the same time via the contact 11 and line 26. It is to be noted that the diode D1 connected to line 25 is at open circuit at this time. Similarly as the switch SP is rotated to have the arm S1 contact with contact 12 the lamp 22 and the capacitor C2 are charged, the lamp 21 remaining energized by the capacitor C1. When arm S1 rotates to contact 13 the lamp 23 and the capacitor C3 are energized, lamps 21 and 22 being continued energized by their respective capacitors C1 and C2. As the arm S1 moves to contact 14 (as shown by arm S2 in the drawing) the lamp 23 is continued energized by its capacitor C3 in a similar manner. Values of the capacitors C1, C2, and C3 are chosen for the desired time operating conditions required. In the same manner additional lamp indicator positions can be provided to complete the desired routine.

When the routine has been completed the lamp indicators are extinguished and the circuit reset merely by opening switch SS and transferring it to contact E whereupon the respective capacitors C1, C2 and C3 are discharged through their respective diodes D1, D2 and D3 via line 25, contact E, switch SS and line 26. The diodes serve the dual purpose not only to discharge the capacitors, but also to prevent erroneously charging the capacitors if the switch SP were operated during the time when switch SS is thrown to contact E.

Although there is shown and described the preferred form of the invention by way of illustration, many modifications will occur to those skilled in the art. It is therefore contemplated by the appended claims to cover all such modifications as fall within the scope and spirit of the invention.

1. An electrical indicating device including a plurality of gaseous discharge devices, a first switch for applying potential consecutively to each said discharge device to cause it to glow, an individual capacitor for each said discharge device energized simultaneouly by said switch, each said capacitor having a value sufficient to maintain glow potential for a predetermined time across its respective discharge device after the applied potential to each said discharge device is removed, and second switch means for simultaneously disconnecting said capacitors from said discharge devices to deenergize each of said discharge devices and extinguish the glow, and means to provide an auxiliary conductive path for said capacitors when disconnected to discharge any remaining energy stored in said capacitors so that reconnection of said capacitors to said discharge devices does not cause said discharge devices to be reenergized and to glow each said discharge device.

2. The invention according to claim 1 in which the capacitor auxiliary discharge means includes a diode so poled as to permit discharge of energy previously stored in said capacitors but does not permit charging of said capacitors therethrough.

References Cited in the file of this patent
UNITED STATES PATENTS

| | | |
|---|---|---|
| 1,845,993 | Wise | Feb. 16, 1932 |
| 2,021,010 | Jenkins | Nov. 12, 1935 |
| 2,167,529 | Scaife | July 25, 1939 |
| 2,168,805 | Pelikan | Aug. 8, 1939 |
| 2,719,966 | Schurr | Oct. 4, 1955 |
| 2,856,564 | Derwin | Oct. 14, 1958 |
| 2,985,794 | Sarratt | May 23, 1961 |